United States Patent Office

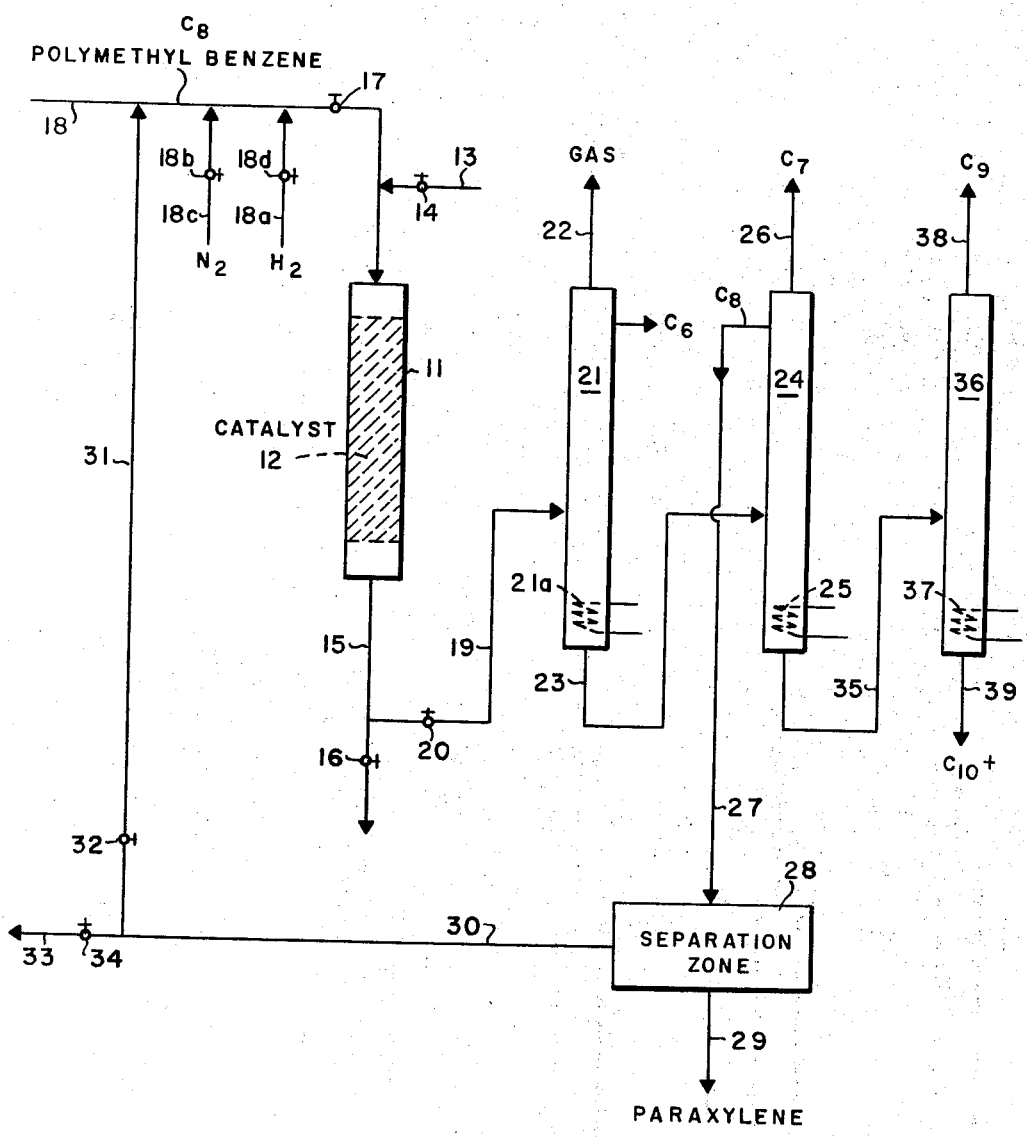

3,825,611
Patented July 23, 1974

---

3,825,611
ISOMERIZATION OF POLYMETHYLBENZENES
Edward F. Wadley and Robert D. Wesselhoft, Baytown, Tex., and Glen P. Hamner, Baton Rouge, La., assignors to Esso Research and Engineering Company, Linden, N.J.
Filed Dec. 16, 1970, Ser. No. 98,522
Int. Cl. C07c 5/24, 15/08
U.S. Cl. 260—668 A         16 Claims

ABSTRACT OF THE DISCLOSURE

Non-equilibrium mixtures of polymethylbenzenes such as ortho-, meta-, and paraxylene, ethylbenzene, the trimethylbenzenes and the tetramethylbenzenes, and the like are isomerized by contacting them in the vapor phase with a catalyst comprising a noble metal on a crystalline alumino-silicate base such as $H_2CaK_2Na_2Al_2Si_6O_{17} \cdot 5H_2O$, or the synthetic crystalline aluminosilicate having a composition expressed in terms of mol ratios of oxides, as follows:

$$1.0 \pm 0.1[(1-X)K_2O:(X)(N(CH_3)_4)_2O] \cdot Al_2O_3:6.5 \pm 1.0SiO_2:YH_2O$$

wherein X has a value of from about 0.001 to about 0.2, and Y has a value from 0 to about 10, said zeolite base being in the form of the corresponding hydrogen zeolite which is impregnated or exchanged with a sufficient amount of an aqueous solution of specific noble metal isomerization component to form a catalyst on drying.

CROSS-REFERENCE TO RELATED APPLICATION

This application is related to Ser. No. 684,482 filed Nov. 20, 1967, for Harry E. Robson, Ser. No. 31,009, which is a continuation-in-part of Ser. No. 684,482, filed Apr. 22, 1970, Ser. No. 31,010 filed Apr. 22, 1970, for Glen P. Hamner, Harry E. Robson, and Ralph B. Mason, and Ser. No. 98,524, filed Dec. 16, 1970 for R. D. Wesselhoft and E. F. Wadley.

BACKGROUND OF THE INVENTION (1) Field of the Invention

The present invention is directed to a method of isomerization of a non-equilibrium mixture of polymethylbenzenes with a particular zeolite catalyst. The catalyst is prepared from the zeolite $KCa(AlSi_3O_{16}) \cdot 6H_2O$ and $H_2CaK_2Na_2Al_2Si_6O_{17} \cdot 5HO$ or the synthetic small pore 5 A. crystalline alumino-silicate defined as offretite and erionite and contains a catalytic amount of palladium or platinum. The hydrogen form of the base zeolite is formed and the zeolite is steamed at about 700 to 1500° F.

(2) Description of the Prior Art

It has been known heretofore to form isomerization catalysts by impregnating non-zeolitic silica-alumina with molybdenum oxide or noble metals or by using large pore crystalline zeolites as the carrier base for noble metals. One of the problems heretofore encountered is the failure of certain solid isomerization catalysts to convert ethylbenzene in a mixture of $C_8$ aromatic hydrocarbons to the xylenes, particularly the more valuable xylene, paraxylene which has many uses well known in the art. Likewise, the usual large-pore crystalline zeolite base catalysts such as faujasite, mordenite or small pore 5 A. zeolites, while somewhat effective, have shown poor promise for isomerization due to excessive hydrocracking or hydrogenation of the desired aromatics. The catalyst of the present invention is uniquely superior to other crystalline zeolite base catalysts since good isomerization of mixtures of polymethylbenzene other than equilibrium mixtures occurs without cracking and excellent isomerization selectivity to paraxylene is realized where $C_8$ aromatics are isomerized.

Specific prior art considered in connection with this invention include the following U.S. patents:
3,410,919 (Amir et al.)
3,449,456 (Amir et al.)
3,484,385 (Amir)

SUMMARY OF THE INVENTION

The present invention may be briefly described as a method for the isomerization of a non-equilibrium mixture of polymethylbenzene over a particular catalyst. In its more specific application, the invention is concerned with isomerization of polymethylbenzenes under isomerization conditions by contact with a noble metal catalyst on a specific crystalline zeolitic support. In its more specific aspects the invention involves the isomerization of $C_8$ to $C_{10}$ aromatic hydrocarbons by contact under suitable conditions with a specific noble metal component on a crystalline zeolite which is known in its natural state and referred to in the art as offretite or phillipsite. As reported in "Nature" 214, June 3, 1967, pages 1005–1006, by J. M. Bennet and J. A. Gard, the crystallography of offretite is similar to, but quite distinct from such related zeolites as chabazite, erionite, and gmelinite. Another useful support is natural or synthetic erionite which is $$H_2CaK_2Na_2Al_2Si_6O_{17} \cdot 5H_2O$$

having similar cage openings and is a white zeolitic aggregate of wooly-like films.

PREPARATION OF CATALYST

In preparing the catalyst, the synthetic zeolite base has a composition expressed in terms of mol ratios of oxides, as follows:

$$1.0 \pm 0.1[(1-X)Me_2O:(X)(N(CH_3)_4)_2O]$$
$$:Al_2O_3:6.5 \pm 1.0SiO_2:YH_2O,$$

wherein X has a value of about 0.001 to about 0.2, preferably about 0.01 to about 0.10, Y may be any value from 0 to about 10, and Me represents either potassium or an alkali metal selected from the group consisting of potassium, sodium, and mixtures thereof. The unit cell of the zeolite base is hexagonal, with an A axis 13.31 A., and a C axis 7.59 A., that is, with the C axis being half that of erionite. The zeolite base is ion-exchanged with an ammonium salt ($NH_4Cl$, $(NH_4)_2SO_4$ or $NH_4NO_3$) in an aqueous solution to form the ammonium form of the zeolite. As this material is heated ammonia is liberated forming the hydrogen form of the base. Calcining of the base is conducted in a suitable heating system such as a furnace to a temperature from about 700° to 1500° F. usually about 1100° F. and held at that temperature for about 1 to 24 hours in the presence of steam, 2 hours usually sufficing. Steaming is started at about 700° F. and the temperature is increased at a rate of about 100° F./hour. The steamed support is cooled to ambient temperature and the cool material is then impregnated or exchanged with an ammoniacal palladium chloride solution or platinum chloride solution to give a catalyst containing from about 0.1 to about 1.0% by wt. palladium or platinum.

Further modifications of the steamed base may be realized by re-exchange with ammonium ions in a manner similar to the initial exchange. The impregnation or exchange to add the catalytic component may be carried out on the 2nd ammonium ion exchanged steamed base followed by conventional calcination to obtain a higher degree of hydrogen offretite. One may also exchange the base material prior to adding the isomerization component with rare earth ions to enhance the thermal stability of the offretite.

For the most active hydrogen form of the preferred catalyst, one must remove maximum alkali ions and still maintain a thermally stable zeolite. Ammonium ion exchange of the unsteamed base reduces the sodium content to 0.04 wt. percent and the potassium content to 3.55 wt. percent. Re-exchange of the steamed base with additional ammonium ions lowers the potassium content of the crystalline offretite to 2.2 wt. percent. The synthetic offretite or erionite base material may be physically mixed or spray dried with inert filler such as alumina, silica-alumina, natural clays and the like prior to steam treatment and the addition of the catalytic component such as platinum or palladium, the latter of which is preferred.

BRIEF DESCRIPTION OF THE DRAWING

The present invention will be further illustrated by reference to the drawing in which the single figure is a flow diagram of a preferred mode.

Referring now to the drawing, 11 designates an isomerization catalyst reactor containing a body of catalyst 12. Line 13 controlled by valve 14 is provided for introduction of a free-oxygen containing gas such as air and/or steam for regeneration of the catalyst if required. The air and/or steam is discharged by line 15 controlled by valve 16. When and if a regeneration operation is conducted, valve 17 in line 18 is closed.

The particular zeolites described herein have been converted to the hydrogen form by combination of treatment of the aqueous solution of ammonium chloride or nitrate followed by steaming to form the hydrogen zeolite which is then impregnated with an aqueous solution of palladium or platinum chloride and the like solutions. After the catalyst has been suitably formed and loaded in the reactor 11, the valves 14 and 16 are closed and valve 17 in line 18 is open. Polymethylbenzene feed such as a $C_8$ fraction which may contain ethylbenzene, para-, meta-, and ortho-xylene and other $C_9$ and $C_{10}$ aromatics is introduced by line 18 into the reactor 11 in contact with the bed or body 12 of the catalyst. Suitable means not shown are provided for maintaining the proper temperature level in catalyst bed 12.

The $C_8$ polymethylbenzenes or any other polymethylbenzenes such as $C_9$, $C_{10}$ and the like which will include the trimethylbenzenes and tetramethylbenzenes as well as other members of the same homologous series are introduced to isomerization reactor 12 by line 18 under the conditions stated herein. Hydrogen and/or nitrogen, respectively, may be introduced into line 18 by line 18a controlled by valve 18b and by line 18c controlled by valve 18d.

The isomerizate is withdrawn from the reactor 11 by line 19 controlled by valve 20, valve 16 being closed and the isomerizate introduced into a distillation zone 21 which is suitably a fractional distillation zone equipped with vapor-liquid contact means such as but not limited to bellcap trays and the like, and is provided with a heating means illustrated by steam coil 21a but which suitably may be a pump-around furnace or other heating means. Temperatures are adjusted in zone 21 to remove overhead gaseous material by line 22 which may be recycled to line 18 or discarded as may be desirable. The $C_7$ or heavier aromatic hydrocarbons are withdrawn from zone 21 by line 23 and introduced thereby into zone 24 which is similarly equipped to zone 21 and is provided with a heating means such as steam coil 25 and bellcap trays not shown. A $C_7$ fraction which is toluene may be withdrawn by line 26 and used as such while a $C_8$ fraction is withdrawn by line 27 and discharged thereby into a separation zone 28 which is suitably a fractional crystallization zone and may comprise distillation towers as well as fractional crystallization facilities to separate paraxylene and other isomers; paraxylene is the preferred isomer, and it may be withdrawn by line 29 for use as may be desired while the other isomers such as ortho- and meta-xylenes may be separated by distillation by means not shown with the orthoxylene recovered while the meta-xylene is recycled by line 30 and branch line 31 controlled by valve 32 to line 18 for further treatment.

It may be desirable to withdraw the meta- and orthoxylenes. In this case this may be accomplished by opening line 33 controlled by valve 34.

It is to be uderstood that while separation zone 28 is described as a crystallization and distillation operation, it suitably may be other separation means such as known in the art including chromatographic separations and adsorption and desorption from suitable zeolites.

The $C_9$ and $C_{10}$ and heavier aromatic hydrocarbons are withdrawn from zone 24 by line 35 and introduced thereby into fractional distillation zone 36 which is equipped similarly to zones 21 and 24 and is provided with a heating means 37 by means of which the heat is adjusted allowing a $C_9$ fraction to be removed by line 38 and a $C_{10+}$ fraction by line 39.

It is to be understood that $C_9$ and other fractions may be recycled to line 18 as may be desired and separately recovered.

By using a synthetic crystalline small pore zeolite containing a hydrogenation component prepared in accordance with the present invention unobvious and advantageous results are obtained as illustrated in the following table.

TABLE I

|  | Feed | Palladium on treated H-offretite | | | | Palladium on treated H-erionite | Isomerization (amir catalyst) |
|---|---|---|---|---|---|---|---|
| Pressure, p.s.i.g. |  | 250 | 250 | 250 | 15 | 250 | 250 |
| Temperature, °F. |  | 700 | 750 | 875 | 800 | 850 | 750 |
| Feed rate, v./v./hr. |  | 1.2 | 2.3 | 1.16 | 4.6 | 1.2 | 1.1 |
| H₂/oil, mol ratio |  | 8.5 | 8.5 | 8.6 | 8.5 | 8.5 | 7.2 |
| Composition: |  |  |  |  |  |  |  |
| Gas |  | 0.7 | 0.8 | 1.0 | 0.7 | 0.7 | 0.3 |
| Non-aromatics | 0.2 | 0.2 | 0.1 | 0.1 | 0.1 | 0.2 | 1.0 |
| Benzene | 0 | 0.6 | 0.8 | 1.3 | 0.5 | 1.0 | 0.8 |
| Toluene | 0.1 | 2.2 | 2.6 | 1.9 | 2.1 | 1.3 | 2.5 |
| Ethylbenzene | 14.6 | 12.6 | 12.2 | 11.9 | 12.3 | 12.5 | 12.8 |
| Paraxylene | 10.0 | 18.8 | 19.0 | 19.4 | 18.7 | 19.7 | 18.4 |
| Methaxylene | 49.9 | 43.4 | 42.7 | 42.0 | 43.3 | 43.1 | 42.1 |
| Orthoxylene | 25.1 | 19.0 | 18.9 | 19.9 | 20.0 | 19.6 | 18.9 |
| C₉ aromatics | 0.1 | 2.1 | 2.5 | 1.4 | 2.2 | 1.5 | 2.4 |
| C₁₀ aromatics |  | 0.4 | 0.4 | 0.1 | 0.1 | 0.4 | 1.0 |
| Ethylbenzene loss, percent |  | 13.5 | 16.2 | 18.5 | 15.5 | 14.1 | 11.7 |
| Xylene loss, percent |  | 4.6 | 5.3 | 3.3 | 3.5 | 3.1 | 6.6 |
| R/R |  | 3.0 | 3.1 | 5.6 | 4.4 | 4.5 | 1.8 |
| Kₓ of product |  | 23.1 | 23.6 | 23.6 | 22.8 | 23.9 | 23.2 |

It will be seen that the palladium on synthetic hydrogen offretite and erionite is superior to the isomerization operation conducted with the Amir catalyst referred to in the prior art.

The present invention is, therefore, unobvious and advantageous over the prior art.

The conditions to be selected for the isomerization reaction fall into the following ranges: pressure: 15 to 500 p.s.i.g.; temperatures: 700 to 950° F.; feed rate: 1.0 to 16 v.v./hr.; hydrogen rate: 3/1 to 10/1 mols $H_2$ per mol of feed. Nitrogen may also be used in amounts sufficient to provide a nitrogen rate of 0.1 to 4.0 mols $N_2$ per mol of total gas.

In the table the term $R/R$ is referred to; this is the reduction ratio of the percentage loss of ethylbenzene to xylene. In the prior art process such as employing the Amir catalyst, the ratio is only about 1.7 to 1 whereas in the present invention under the selected conditions this ratio is increased to 3 to 1 or higher. Moreover, in the present invention, only a small amount of the noble metal catalyst is used.

Another advantage of the present invention is that the formation of by-products such as gas, benzene, toluene, $C_9$ and $C_{10}$ aromatics is relatively low, ordinarily less than 10 percent which keeps the ethylbenzene content from building up to an undesirable level in the recycle loop in a plant producing paraxylene or orthoxylene where the paraxylene plant filtrate is isomerized to form additional paraxylene for recovery. In short, the present invention has many advantages over the prior art and is unobvious therefrom.

The nature and objects of the present invention having been completely described and illustrated and the best modes and embodiments contemplated set forth what we wish to claim as new and useful and secure by Letters Patent is:

1. A method for isomerizing a non-equilibrium mixture of polymethylbenzenes which comprises subjecting said mixture to a temperature from about 700° F. to about 950° F. in the vapor phase at a feed rate of about 1.0 to about 16.0 v./v./hour in the presence of hydrogen at a hydrogen-to-oil mol ratio of about 3.0 to about 10 to 1 in the presence of from about 0.1 to about 1.0% by weight of a noble metal catalyst selected from the group consisting of palladium and platinum supported on the hydrogen form of offretite having a composition expressed as $KCa(AlSi_3O_{16}) \cdot 6H_2O$, to form an isomerizate and recovering a selected polymethylbenzene from said isomerizate.

2. A method in accordance with claim 1 in which the metal is palladium.

3. A method in accordance with claim 1 in which the metal is platinum.

4. A method in accordance with claim 1 in which the mixture of polymethylbenzenes comprises a mixture of xylenes and ethylbenzene and the selected polymethylbenzene is para-xylene.

5. A method in accordance with claim 1 in which the selected polymethylbenzene is recovered from the isomerizate by crystallization.

6. A method in accordance with claim 1 in which the temperature is within the range of about 750° F. to about 900° F.

7. A method for isomerizing a mixture of polymethylbenzene containing polymethylbenzenes in a ratio other than an equilibrium ratio, said mixture of polymethylbenzene consisting essentially of ethylbenzene and ortho- and metaxylene which comprises contacting said mixture under isomerization conditions in the presence of hydrogen with from about 0.1 to about 1.0% by weight of a noble metal catalyst selected from the group consisting of palladium and platinum supported on offretite having a composition expressed as $KCA(AlSi_3O_{16}) \cdot 6H_2O$, said offretite having been converted to the hydrogen form to form an isomerized product and recovering from said product paraxylene.

8. A method in accordance with claim 7 in which the offretite is synthetically formed.

9. A method in accordance with claim 7 in which the offretite is naturally formed.

10. A method in accordance with claim 7 in which the isomerization conditions include:
   (a) vapor phase;
   (b) a temperature within the range of about 700° to about 950° F.;
   (c) a feed rate of about 1.0 to about 16.0 v./v./hour.

11. A method for isomerizing a mixture of xylenes in a ratio other than an equilibrium ratio which comprises contacting said mixture under isomerization conditions in the presence of hydrogen with a catalyst consisting essentially of a catalytic amount from about 0.1 to about 1.0% by weight of palladium on offretite, said offretite having been converted to the hydrogen form, to form an isomerized xylene mixture containing p-xylene and recovering p-xylene from the mixture.

12. A method in accordance with claim 11 in which the isomerization conditions include:
   (a) vapor phase;
   (b) temperature within the range from about 700° to about 950° F.;
   (c) a feed rate of about 1.0 to about 16.0 v./v./hour;
   (d) the p-xylene is recovered by crystallization from the isomerized mixture.

13. A method in accordance with claim 11 in which the offretite is synthetically formed.

14. A method in accordance with claim 11 in which the offretite is naturally formed.

15. A method for isomerizing a mixture of polymethylbenzene containing polymethyl benzenes in a ratio other than an equilibrium ratio which comprises contacting said mixture under isomerization conditions in the presence of hydrogen with from about 0.1 to 1.0% by weight of a noble metal catalyst selected from the group consisting of palladium and platinum supported on offretite $KCa(AlSi_3O_{16}) \cdot 6H_2O$, said offretite having been converted to the hydrogen form, to form an isomerized product and recovering from said product a selected isomeric polymethylbenzene.

16. A method in accordance with claim 15 in which the polymethyl benzenes are xylenes and the selected polymethyl benzene is para-xylene.

References Cited

UNITED STATES PATENTS

| | | | |
|---|---|---|---|
| 3,578,723 | 5/1971 | Bowes et al. | 260—668 A |
| 3,409,685 | 11/1968 | Donaldson et al. | 260—668A |
| 3,409,686 | 11/1968 | Mitsche | 260—668 A |
| 3,370,099 | 2/1968 | Plank et al. | 260—668 A |
| 3,460,904 | 8/1969 | Young | 23—112 |
| 3,582,497 | 6/1971 | Best et al. | 252—455 Z |
| 3,592,760 | 7/1971 | Young | 208—111 |

CURTIS R. DAVIS, Primary Examiner

U.S. Cl. X.R.

260—672 T